June 30, 1970   H. J. TYLER   3,517,955
INSTRUMENT LINKAGE WITH DISENGAGEABLE PIVOTAL COUPLING
Filed June 7, 1968
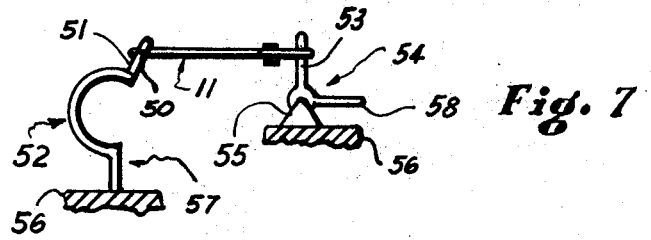
Fig. 7
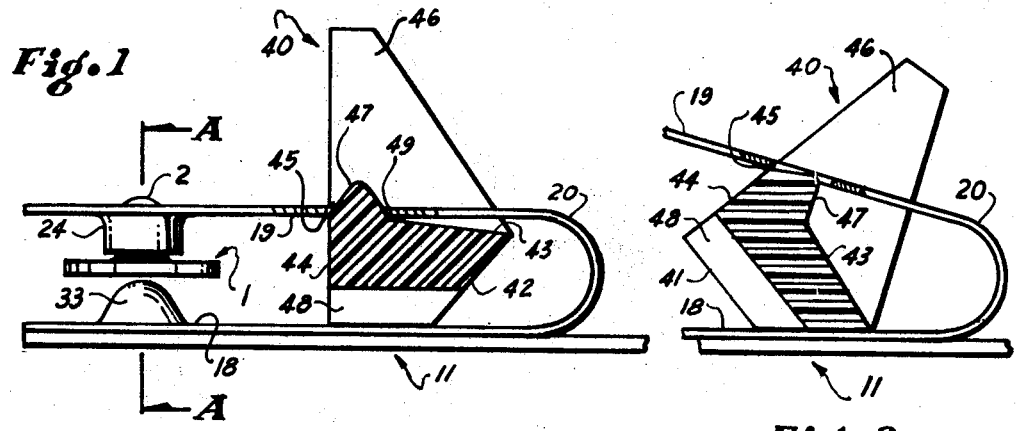
Fig. 1
Fig. 3
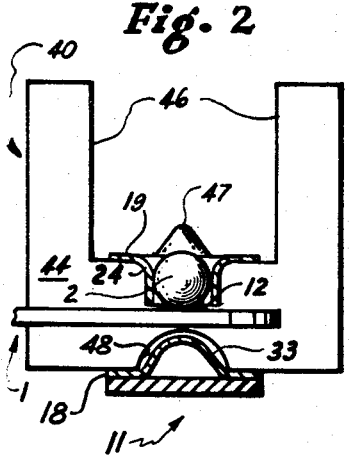
Fig. 2
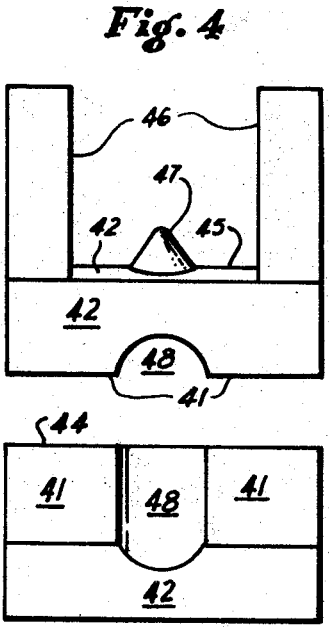
Fig. 4
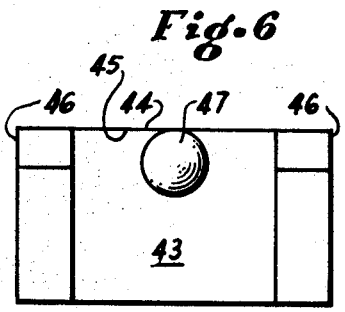
Fig. 6
Fig. 5

United States Patent Office 3,517,955
Patented June 30, 1970

3,517,955
INSTRUMENT LINKAGE WITH DISENGAGEABLE PIVOTAL COUPLING
Hugh Jean Tyler, Scottsville, N.Y., assignor to Sybron Corporation, a corporation of New York
Filed June 7, 1968, Ser. No. 735,349
Int. Cl. B25g 3/38
U.S. Cl. 287—101                              6 Claims

ABSTRACT OF THE DISCLOSURE

A socket in one arm of U-shaped spring clip on a lever receives a ball on the end of another lever, the other arm of the clip holding the ball in place. The ball is released by turning an accentric-like operator held between the clip arms. The operator has a polygonal cross-section, one side of which normally lies flat on one arm of the clip. A teat on the other side of the operator projects into a hole in the other clip arm to retain the operator in place and a pair of arms on the operator straddle the other clip arm. When tipped by pressure on its arms, the operator spreads the clip arms enough to allow the ball to be lifted out of the socket.

---

The present invention relates to improvements in instrument linkage such as is disclosed in G. A. Cook et al. Pat. No. 3,245,707, granted Apr. 22, 1966 and assigned to the assignee of the present invention. In this prior art linkage and others, a pivotal coupling is provided between a pair of levers, and means in provided for disengaging the coupling, so that the levers can be separated.

As in the Cook et al. linkage, the coupling of the present invention includes a U-shaped clip, the arms of which must be spread to disengage (or engage) the coupling. In addition, however, an operator between the clip arms is turned to spread the clip arms. One advantage of the present invention is that the operator simplifies construction of the coupling.

In the drawing:

FIGS. 1 and 2, corresponding to FIGS. 5 and 6 of the Cook et al. patent are a side elevation with the operator sectioned and an end invention, partly sectioned, respectively, of a pivotal coupling according to the invention, and FIG. 3 is a view like FIG. 1 but showing a moved position of parts in the latter. FIG. 2 includes a partial section on line AA, FIG. 1. FIGS. 4, 5 and 6 are, respectively, an elevation and plan views of the aforesaid operator alone. FIG. 7 is a schematic diagram of an instrument to which the linkage according to the invention is suited.

In the present description, parts that are the same as those disclosed in the Cook et al. patent, are also designated by the same reference numerals. Thus, ball 2 on lever 1 pivotally connects the latter to lever 11 by being received in a socket formed by extrusion 24 in the arm 19 of spring clip 20, the arm 18 of which is secured to lever 11 and has a protrusion 33 more or less alined with extrusion 24. However, an operator 40, shortly to be described in more detail, eliminates the plate 21 and pin 22 of the patent.

In the patent coupling, the elongated right end of the plate 21 provided a lever for spreading the arms of the clip 20 and, as well, a bottom for the socket provided by extrusion 24. Under some conditions of use, it does no appreciable harm if the ball 2 enters the extrusion so far that lever 1 contacts the edge of the extrusion. Thus, when the ball contacts the side of the socket and the lever 1 contacts the extrusion edge at a place nearest the ball contact, the moment arm of friction is about half the extrusion wall thickness (typically 0.010 inch), whereas if the ball can bottom and prevent lever-extrusion contact, the corresponding moment arm is always the radius of the ball. Since a slight linkage involves small contact forces, as is generally the case with instrument linkage of the kind particularly envisaged here, and contact pressure does not deform the contacting material then, on the average, extrusion-lever contact introduces no more friction than that produced by bottoming of the ball on a plate 21.

As for the pin 22, this spaced the arms of the clip 20 so as to provide a predetermined amount of axial play for the coupling, to allow for cocking of one of the levers 1 and 11 with respect to the other.

Operator 40 provides both the clip arm spreading function of plate 21 and the arm spacing function of pin 22.

As will be seen from the drawing, operator 40 is in essence a prism of trapezoidal cross-section. The basic prism form has been modified by the arms 46, the teat 47, and the channel 48, and the section deviates slightly from being strictly trapezoid. The facets of the prism are denoted by reference numerals 41 through 44, and are flat and rectangular, except as the described modifications dictate. Opposing facets 42 and 43 are at an angle of the order of 45° with respect to each other, whereas facets 41 and 43 are just a few degrees out of parallelism. Preferably, the operator is cast plastic, say, nylon. The angles and dimensions for the operator (and for the other structure), used in hte drawing are substantially to scale, through much magnified (around 10 times) as compared to actual embodiments of the structure. Actual proportions are not critical, as long as they are such that the operator 40 can spread the arms of clip 20 enough to pass the lever 1 and ball 2 between extrusion 24 and protrusion 33, and can let them close far enough that most of ball 2 must stay in the extrusion 24.

As will be seen in FIG. 1, the arms 18 and 19 spring closed as far as the facets 41 and 43 permit. While these facets could be parallel, it will be observed that whereas the surface of facet 41 is tangent to the upper surface of arm 18, only the edge 45 of facet 43 (and of facet 44) touches the under surface of arm 19. In manufacturing, it is easier to control the width of facet 44 than the angle between facets 41 and 43, so these are cast out of parallel enough that only the shorter dimension of facet 44 controls the spacing between arms 18 and 19 in FIG. 1.

Edge 45 is, in effect, an axis about which the operator 40 is pivoted. In order to fix the edge with respect to clip 20, the teat 47 is provided, which is received in hole 49 in clip arm 19. The teat projects far enough above facet 43 that if the operator is tilted clockwise to the position shown in FIG. 3, some of the teat still remains in hole 49, thereby preventing substantial shift of edge 45, though, as will be evident from the figures, some play is present.

When the operator 40 is tilted on edge 45 to the position of FIG. 3, the clip arms spread by an amount determined by the distance from edge 45 to facet 42 along the normal to the latter. This distance is again more easily controlled than the angle between facets 44 and 42.

The main purpose of arms 46 is to be a finger-operated handle for tipping the operator. Arms 46 also help stabilize the position of edge 45, that is, without them the operator could pivot on a vertical axis through teat 47. Channel 48 is provided to permit assembly of the operator to the clip 20. Operator 40 is inserted in the orientation shown in FIG. 1, but at the end of the clip, which is spread, and then moved rightwards over the protrusion 33 which is received in channel 48. Channel 48 can be somewhat smaller than shown depending on how far apart it is allowable to spread arms 18 and 19 in order to clear protrusion 33 when assembling operator 40 to the clip 20. Channel 48 is, of course, substantially narrower than lever 11, as can be seen from FIG. 2.

There is the possibility of tipping the operator 40 counterclockwise from the position of FIG. 1. The main difference between this and tipping to the position shown in FIG. 3 is that in the latter, the operator stays put until tipped back by hand to the FIG. 1 position. With counterclockwise tipping from the FIG. 1 position, the operator would stay tipped only as long as it is actually held. Once released, it would snap back to the FIG. 1 position. While conceivably it could be tipped far enough to snap over to where facet 44 was tangent to arm 18, teat 47 would be out of hole 49 before that and might not return therein when the operator was tipped back. Actually, in an actual example of the clip as shown, the operator is too close to the bend in the clip 20 to be tilted counterclockwise from the FIG. 1 position without exerting an undesirably large force, in order to overcome the stiffness at the clip bend. It is to be noted that the intersection of facets 41 and 44 can be rounded so as to create a force couple sufficient to tip the operator back, unless held by hand.

It would be possible to invert the clip, and/or position it in a position rotated 180° about the vertical from the position shown in FIG. 1. In the latter case, it would be a bit too close to lever 1, so the clip would have to be lengthened and/or hole 49 relocated. Various other reversals and interchanges of parts may be envisaged, e.g., interchanging protrusions 33 and extrusion 24, mounting arm 19, instead of arm 18, to lever 11, and so on.

Operator 40 is quite light even as compared to the less bulky metal parts it replaces. Great simplification of manufacturing is achieved by it. Thus, the pin 22 and plate 21 of the Cook et al. coupling, each require welds to assemble them to the clip 20, and the casting of operator 40 replaces the several forming procedures required to make pin 22 and plate 21.

In FIG. 7, merely by way of example is shown one of the many instrument arrangements for which the linkage according to the present invention is suited. Thus, a lever 11 is pivoted at 50 to the free end 51 of a Bourdon tube 52. The other end of lever 11 is pivoted by the novel pivotal coupling of the present invention to the one arm 53 of a crank 54 pivoted at 55 to a fixed entity 56 to which last the fixed end 51 of tube 52 is, in effect, also fixed. Arm 58 represents the output of the tube, providing an indication, operating a switch, or the like. The operation of the described instrumentality needs little description, i.e., the interior of the tube 52 has a variable pressure therein which makes the free end 51 of the tube deflect approximately left and right in the plane of the drawing, causing corresponding deflection in the linkage elements connected thereto, as is well known.

The foregoing is a detailed description of my invention as required by the statute. The description is, of course, exemplary, and various modifications and uses thereof not described herein will be obvious to one skilled in the art and may be adopted without departing from the invention as set forth in the claims annexed hereto.

I claim:

1. In an instrument wherein there is a first lever, condition responsive means for moving said first lever, a second lever, and output means for being moved by said second lever; wherein said first lever has a portion thereof pivotally connected to a portion of said second lever, one said portion having first and second members extending alongside each other and being provided with bias urging said members together, the other said portion being between said members, and there being pivot means pivotally interconnecting said members with said other said portion, said pivot means being of the type wherein pivotal connection is maintained by said bias but disengageable by spreading said members apart against the urging of said bias;
and wherein there is the improvement comprising an operator movable for spreading said members, said operator being mounted between said members; said operator being a body having a teat projecting therefrom, and one of said members has a hole loosely receiving said teat, said body having differing dimensions, and being rotatable about an axis located substantially at said hole and running transverse to the direction of spreading said members for bringing various of its differing dimensions between said members for spreading same by amounts corresponding to said dimensions.

2. The invention of claim 1, wherein said body has a pair of wings straddling one of said members.

3. In an instrument wherein there is a first lever, condition responsive means for moving said first lever, a second lever, and output means for being moved by said second lever; wherein said first lever has a portion thereof pivotally connected to a portion of said second lever, one said portion having first and second members extending alongside each other and being provided with bias urging said members together, the other said portion being between said members, and there being pivot means pivotally interconnecting said members with said other said portion, said pivot means being of the type wherein pivotal connection is maintained by said bias but disengageable by spreading said members apart against the urging of said bias;
and wherein there is the improvement comprising an operator movable for spreading said members, said operator being mounted between said members;
said operator being an object having one dimension of such size as corresponds to at least the amount said members must be spread apart in order to disengage said pivot means, and another dimension of such size as corresponds to at most the amount which the said members can be spread apart and said pivotal connection still be maintained, said operator being positionable to interpose either of the said dimensions between said members so as to spread same apart the corresponding amount;
said operator being a body having a first pair of opposing facets spaced apart by said first dimension, and a second pair of opposing facets spaced apart by said second dimension, and said body has means for retaining it in place while permitting said body to be rotated so that one or the other of said pairs of facets extends alongside said members;
one of said facets of said first pair having a teat projecting therefrom and one of said members having a hole receiving said teat; said one pair of facets intersecting the other said pair of facets, said first pair of facets being substantially parallel and normal to one face of said second pair, the other facet of said other pair being at an angle sufficiently acute with respect to the first said facet that said body can be rotated to bring said other facet of said other pair alongside one of said members with said teat remaining received in said hole, whereby to provide the last said means.

4. The invention of claim 3, wherein said body has a pair of wings straddling one of said members.

5. In an instrument having condition responsive means, output means and linkage including a first lever caused to move by said condition responsive means and a second lever movable to operate said output means, said first lever having pivotal connection to said second lever such that motion of said first lever moves said second lever; one end of one said lever having first and second members alongside each other, one end of the other said lever having a third member between said first and second members, and said members having disengageable pivot means pivotally and disengageably securing said third member between said first and second members, whereby to provide said pivotal connection; and said first member being movable away from said third member to disengage said pivot means such as to release said third member from said first and second members; the improvement comprising an operator for so moving said first member away from said second member, said operator being a body lying between said first and second members, and being hinged to one member of said first and second members, and having a first facet tangent to the other member of said first and second members; the axis of hinging of said body being located and directed such that if said body is deflected about said axis, said first facet moves away from said other member; said body having a second facet so located with respect to said first facet that when said first facet moves away from said other member a predetermined amount, said second facet moves into tangency with said other member, thereby moving said first member away from said second member; the effective radius of said first facet being less than the effective radius of said second facet by such amount that said first member moves far enough away from said second member to disengage said pivot means; the first said effective radius being such that when said first facet is tangent to said other member, said first and second members are close enough together that said pivot means pivotally secures said third member to said first and second members; said hinge being a teat projecting from one of said one member and said body and toward the other thereof, and said other thereof having a hole receiving said teat, said hole being of such shape and dimension to permit deflection of said body with said teat, and said hole defining said axis running transverse to the direction of movement of said first member away from said second member.

6. The invention of claim 5, wherein said body has a pair of wings straddling one of said members.

References Cited
UNITED STATES PATENTS

| | | | |
|---|---|---|---|
| 1,483,294 | 2/1924 | Fox | 287—89 |
| 2,060,150 | 11/1936 | Warner | 287—89 |
| 2,756,083 | 7/1956 | West | 287—89 |
| 2,788,557 | 4/1957 | Garsson. | |
| 3,245,707 | 4/1966 | Cook et al. | 287—101 |

DAVID J. WILLIAMOWSKY, Primary Examiner

A. V. KUNDRAT, Assistant Examiner

U.S. Cl. X.R.

287—89